United States Patent
Gwin

(10) Patent No.: US 11,182,100 B2
(45) Date of Patent: Nov. 23, 2021

(54) SSD TEMPERATURE CONTROL TECHNIQUE

(71) Applicant: Intel Corporation, Santa Clara, CA (US)

(72) Inventor: Paul J. Gwin, Orangevale, CA (US)

(73) Assignee: Intel Corporation, Santa Clara, CA (US)

( * ) Notice: Subject to any disclaimer, the term of this patent is extended or adjusted under 35 U.S.C. 154(b) by 10 days.

(21) Appl. No.: 16/183,654

(22) Filed: Nov. 7, 2018

(65) Prior Publication Data

US 2019/0073154 A1    Mar. 7, 2019

(51) Int. Cl.
*G06F 3/06* (2006.01)

(52) U.S. Cl.
CPC ............ *G06F 3/0653* (2013.01); *G06F 3/061* (2013.01); *G06F 3/0604* (2013.01); *G06F 3/0658* (2013.01); *G06F 3/0659* (2013.01); *G06F 3/0679* (2013.01)

(58) Field of Classification Search
CPC .... G06F 3/0653; G06F 3/0617; G06F 3/0619; G06F 3/0634; G06F 3/0647; G06F 3/0685; G06F 3/0688; G06F 3/0625; G06F 3/0655; G11C 7/04; G11C 7/22
See application file for complete search history.

(56) References Cited

U.S. PATENT DOCUMENTS

| | | | |
|---|---|---|---|
| 9,257,157 B2 * | 2/2016 | Chu | G11C 7/04 |
| 9,355,024 B2 * | 5/2016 | Nguyen | G06F 1/206 |
| 9,804,796 B1 * | 10/2017 | Gwin | G06F 3/0625 |
| 10,013,194 B1 * | 7/2018 | Yang | G06F 1/206 |
| 10,394,618 B2 * | 8/2019 | Foxworth | G06F 3/0646 |
| 10,564,861 B2 * | 2/2020 | Linnen | G06F 3/0616 |
| 2009/0091996 A1 * | 4/2009 | Chen | G11C 7/04 365/212 |
| 2010/0293305 A1 * | 11/2010 | Park | G11C 7/04 710/33 |
| 2012/0331207 A1 * | 12/2012 | Lassa | G06F 3/0625 711/103 |
| 2013/0182507 A1 * | 7/2013 | Marko | G11C 16/20 365/185.21 |
| 2014/0281445 A1 * | 9/2014 | Varma | G06F 1/3203 713/1 |
| 2016/0162219 A1 * | 6/2016 | Erez | G06F 3/0653 711/103 |

(Continued)

OTHER PUBLICATIONS

B. P. Dewan-Sandur et al., "Thermal management of die stacking architecture that includes memory and logic processor," 56th Electronic Components and Technology Conference 2006, San Diego, CA, 2006, pp. 6 pp.—(Year: 2006).*

(Continued)

*Primary Examiner* — Khoa D Doan
(74) *Attorney, Agent, or Firm* — Compass IP Law PC

(57) ABSTRACT

An apparatus is described. The apparatus includes a solid state drive (SSD) controller that includes logic circuitry to perform an event based hottest non volatile memory die identification process in which one or more different hottest non volatile memory die within the SSD are able to be identified over an operational time period of the SSD in response to different respective events that arise during the operational time period.

14 Claims, 3 Drawing Sheets

(56) References Cited

U.S. PATENT DOCUMENTS

| | | | |
|---|---|---|---|
| 2016/0179158 A1* | 6/2016 | Thomas | G06F 1/206 |
| | | | 713/340 |
| 2016/0292111 A1* | 10/2016 | Doo | G06F 13/1689 |
| 2016/0320971 A1* | 11/2016 | Postavilsky | G06F 3/0659 |
| 2017/0046079 A1* | 2/2017 | Vidyapoornachary | |
| | | | G06F 3/0616 |
| 2017/0344309 A1* | 11/2017 | Balakrishnan | G06F 13/16 |
| 2018/0260152 A1* | 9/2018 | Bar | G06F 3/0625 |
| 2019/0094927 A1* | 3/2019 | Kuwano | G06F 1/1684 |
| 2019/0161341 A1* | 5/2019 | Howe | B81B 7/0087 |

OTHER PUBLICATIONS

Q. Zheng and Z. Ping, "Active Disturbance Rejection Control for Server Storage System Temperature Regulation*," 2018 IEEE 14th International Conference on Control and Automation (ICCA), Anchorage, AK, 2018, pp. 1113-1118, doi: 10.1109/ICCA .2018.8444348. (Year: 2018).*

* cited by examiner

SSD TEMPERATURE CONTROL TECHNIQUE

FIELD OF INVENTION

The field of invention pertains to the computing sciences, generally; and, more specifically, to an improved SSD temperature control technique.

BACKGROUND

A problem with solid state drive (SSD) devices is the complexity of their internal thermal profiles over their lifetime. Specifically, apart from a controller logic die and its associated memory, an SSD can also contain hundreds of non volatile memory chips. Whether or not any of the die are near, or at, a thermal temperature extreme (in which the die's temperature reaches a value where the die's correct operation can no longer be guaranteed) is largely an unknown. Here, for instance, over the lifetime of the SSD, both internal and external changes will arise in the SSD's operating environment. For example, the SSD may be "packed tightly" in an I/O storage system with other heavily used SSDs that raise the SSD's external and internal ambient temperatures. Likewise, the manner in which the SSD is used by the host system (the workload of the SSD) can change (e.g., mostly writes to mostly reads, largely targeting one chip than another chip and then mostly targeting the other chip, etc.) which can also dramatically change the SSD's internal temperature profile.

Traditional SSDs monitored the temperature of each non volatile memory chip in the SSD in order to keep track of the SSD's internal thermal profile. Here, each non volatile memory chip includes its own thermal sensor. Temperature readings from each non volatile memory chip were periodically taken so that, essentially, the temperature state of each non volatile memory chip was known. As SSDs have become increasingly complex, to the point of including hundreds of non-volatile memory chips, maintaining regular temperature readouts from all the die has become too cumbersome. Specifically, large amounts of temperature related traffic would be generated within the SSD such that SSD performance would noticeably suffer (the SSD would spend too much time handling temperature traffic and not enough time handling read/write requests from the host).

A possible approach identifies a fixed subset of die (e.g., a specific set of 4 die or 8 die) from which temperature readings are periodically taken and temperature monitoring for the entire SSD is based upon. Here, the internal temperature monitoring traffic is greatly reduced, however, the fixed subset of die do not accurately reflect the thermal profile of the SSD in many use cases over the SSDs extended lifetime.

For example, if only the subset of die are being accessed in a certain time window, the thermal readings may not represent the highest die temperature amongst all the die in the drive. That is, under certain workload/platform/SSD conditions, the temperature readings from the subset of die may not accurately reflect the hottest temperature die in the SSD. As such, SSD performance has suffered (from the internal traffic associated with monitoring the subset of die) yet thermal management is still improper.

FIGURES

A better understanding of the present invention can be obtained from the following detailed description in conjunction with the following drawings, in which.

DETAILED DESCRIPTION

Figure 1:
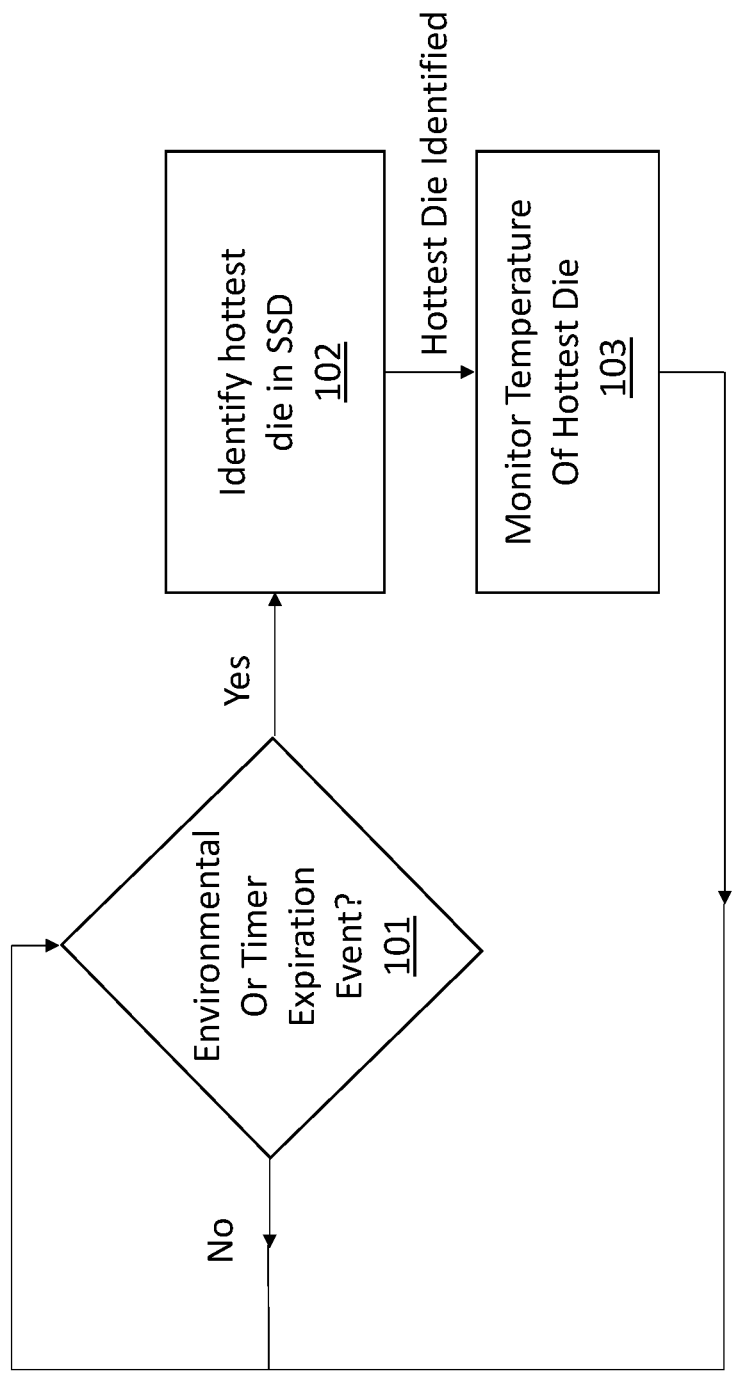
FIG. 1 shows an improved SSD temperature control method.

FIG. 1 shows another approach that greatly improves upon the subset of die approach described in the background. According to the embodiment of FIG. 1, the SSD repeatedly "re-calibrates" or "re-identifies" 102 which subset of die (which may include just a single die) is/are to be relied upon for making thermal related decisions. That is, over time, the specific non volatile memory die whose temperature readings are used to make SSD workload throttling decisions can change over the lifetime of the SSD.

Here, each identification effort 102 attempts to identify "the hottest" die in the SSD based on the SSD's current environmental conditions. The SSD can then focus its workload throttling decisions by monitoring 103 only the identified hottest die in the SSD. That is, the hottest non volatile memory die will cross a maximum temperature rating before any of the other non volatile memory die in the SSD. As such, the SSD need only throttle down the SSD's workload if the selected/hottest die approaches its maximum temperature rating.

As environmental conditions of the SSD change 101, the SSD re-identifies the particular die it will take temperature readings of and base workload throttling decisions upon. For instance, if the SSD initially chooses a particular non volatile memory die that is being accessed more frequently than all other die as its selected die for temperature profiling, and then the workload conditions of the SSD change such that another die is being accessed more frequently than all other die including the selected die, the SSD will "switchover" from the initial die to the other die as the die whose temperature readings are used to base SSD throttling decisions upon.

Alternatively or in combination, the SSD may periodically 101 re-identify the particular die it will take temperature readings of and base workload throttling decisions upon. That is, rather than some detected environmental change being the trigger for a next re-identification process, instead, expiration of a timer is the trigger for the re-identification. Here, each time the SSD performs a re-calibration, a timer starts counting with a set time period over which the timer will count. If the timer expires before an environmental change event triggers a next re-identification process, the re-identification process 102 is automatically triggered, the timer is reset and begins to count over the next set time period.

With respect to environmentally detected changes 101 that trigger a re-identification process 102, such changes can include both events that are external to the SSD and events that are internal to the SSD.

With respect to external events, such events can include any of:

1) changes in high level host system configuration that could affect host system internal temperature (e.g., an increase in host system clock speed, incorporation of an additional processor, incorporation of additional memory, incorporation of an upgraded processor, incorporation of upgraded or different memory, an observed increase or decrease in processor utilization (e.g., the software begins to continually execute more or less software than before, etc.);

2) changes in the storage and/or I/O configuration of the host system (e.g., addition of another SSD to the host system (particularly is added in a socket/location that is physically near the SSD), removal of an SSD from the host system, removal/addition of another storage device to/from the system (which may affect energy dissipation of a peripheral control hub (PCH) or I/O control hub (ICH) that is physically located proximately to the SSD and may change its ambient temperature); removal/addition of another I/O device from/to a same platform component that the SSD is coupled to (e.g., a same I/O bus, a same PCH, a same ICH, etc.);

3) thermal and/or power related events detected within the host system (e.g., fan failure, high temperature reading warning, crossing of a particular measured temperature beyond some threshold that may affect SSD temperature (e.g., the temperature of a component located near the SSD has crossed some threshold, etc.), a change in power state or performance state of a component (e.g., a change in the power state or performance state of a multi-core processor chip, a change in the power state or performance state of one or more system memory modules, etc.);

4) changes in workload of neighboring SSDs.

Generally, many types of external events that trigger a re-identification process may not result in a change in the die that is selected as the basis for the SSD's temperature profiling. That is, for example, if the ambient uniformly increases around the SSD, the respective temperatures of all memory die within the SSD are apt to increase uniformly resulting in no relative change in the temperatures of the die amongst themselves (the hottest die in the SSD remains the hottest die in the SSD).

Nevertheless, various kinds of external events can result in a change in the hottest die in the SSD. For instance, if another SSD is plugged into the system right next to the SSD along one side of the SSD, the heat from the new SSD may increase the temperatures of the SSD die that are closest to that side to the point where one of these die is identified as the hottest die. Without knowing beforehand which external events result in a change in hottest die and which ones do not, at least early in the SSD's lifetime, a comprehensive list of events that "might" result in a change in hottest die are accepted as triggers for a re-identification process. As explained in more detail further below, over time the SSD controller may learn that various ones of these events do not result in a change in hottest die and decide to ignore these events the next time(s) they occur.

With respect to internal changes that could trigger a re-identification process, generally, such changes are mainly changes in the performance/power states of the SSD and/or workload of the SSD. As is known in the art, a device such as an SSD is functional (can perform its designed for task) in a highest power state. Each lesser power state corresponds to a deeper sleep state in which less power is consumed but more time is needed to wake the device back to the highest power state. When in the highest (functional) power state, the device can operate in a number of performance states in which each higher performance state corresponds to higher device performance but more power consumption by the device. Here, any change in SSD power state or performance state can be used as a trigger event for performing a re-identification process.

With respect to triggering re-identifications based on an observed change in workload, the requests that are sent to the SSD by the host are ultimately resolved at a particular non volatile memory die within the SSD. That is, each request includes an address that corresponds to a particular die that services the request. Over the course of the SSD's runtime, some non volatile memory die may be more frequently accessed than other non volatile memory die based on the addresses of the requests. Here, the most frequently accessed die is apt to be the hottest die, unless the internal packaging and heat flow dynamics within the SSD result in some die being more easily cooled than other die. Here, for instance, a die that is one of the more frequently accessed but is at an internal cooling disadvantage may be identified as the hottest die in the SSD even though another die is accessed more frequently. Thus, identification of hottest die can also take into account known thermal properties of the SSD that tend to cause certain die being hotter than others.

Regardless, if the workload of the SSD changes such that there is a change in the die that receive more accesses, the hottest die in the SSD is apt to change. As such, observances by the SSD controller in changes as to which die are handling the most accesses can be used as basis for triggering a re-identification process.

As a further point of note, SSD controllers are generally designed to change the mappings of the host request addresses to the non volatile memory die. That is, the addresses of the requests that are directed to the SSD from the host are referred to as logical block addresses (LBAs). By contrast, the address that is used physically/actually access data from a particular die is referred to as a physical block address (PBA). The SSD controller maintains LBA to PBA mappings so that any particular incoming LBA is resolved to a particular PBA.

The SSD controller also monitors which PBAs are receiving more activity than other PBAs. Through a process called "wear-leveling" the SSD controller will change the LBA/PBA mappings of data items (identified through their LBAs) that are most popular (and are therefore receiving more accesses than other LBAs) so that they are stored in less frequently used non volatile memory space (an SSD typically has some percentage of its non volatile memory space unused and erased so that it can receive "hot" data items, and/or, the SSD controller will "swap" hot and cold data items (the hot data items are moved to memory space where cold data items are kept and moves the cold data items to the physical locations where the hot data items were stored)).

Conceivably, the hottest die in the SSD can be correlated to the SSD's wear leveling activity. That is, for example, if a particular non volatile memory die has a disproportionally large share of highly active PBAs, the die may be the hottest die in the SSD. If, in executing its wear-leveling function, the SSD controller subsequently moves the data items of the highly active PBAs to another non volatile memory die, the other non volatile memory die may emerge as the hottest die in the SSD. Thus wear leveling statistics, such as movements of the most active PBAs in the SSD, may be used to trigger a re-identification process.

Moreover, any internal SSD workload monitoring (e.g., as performed by the SSD controller) for the purpose of deciding that a re-identification process should be triggered, whether based on current host accessing patterns or wear-leveling data item movements, may focus more on a particular type of access, such as writes, rather than accesses generally. That is, generally, write operations tend to dissipate more heat than read operations. Therefore, any triggering of the re-identification process may be based more on observed write accesses than read accesses or write and read accessed combined. In other embodiments, the SSD controller may more generally just keep track of "accesses"

(which include both reads and writes) and assume that the number of reads and writes are equal.

With respect to the re-identification process itself, in one embodiment, during the SSD's first ever bring-up (the SSD is first installed in the host system), the SSD controller generates artificial traffic (e.g., a sequence of write and read operations (or just write operations) that physically access the non volatile memory die (data is physically written to and/or read from the die) but nevertheless are recognized as non valid and can be freely overwritten). In an embodiment, the SSD sends equal amounts and types of traffic to all memory die to establish a baseline. As the SSD controller is applying the artificial traffic to the memory die, the SSD is also monitoring temperature measurements from, e.g., all of the non volatile memory die in the SSD. In essence, the SSD attempts to determine a steady-state or baseline thermal environment and identify the hottest die in that environment.

Here, there is no real loss in SSD performance owing to the large amounts of internal temperature monitoring and artificial traffic generation because the process is part of the SSD installation (the host system is not yet actually using the SSD). After the initial hottest die identification, in an embodiment, the SSD ranks the die from hottest die to coolest die and chooses the first ranked die as the die that all temperature based decisions for the SSD are to be based on. The ranked list is then persisted in non volatile memory space for reference during the subsequent life of the SSD.

After installation of the SSD, the SSD controller looks for any external or internal event triggers for performing the re-identification process. If such an event occurs, in an embodiment, the SSD controller begins to temperature monitor all the non volatile memory die within the SSD for, e.g., a pre-set amount of time and/or after a minimum number of temperature samples have been collected for each die. The SSD then again ranks the die from hottest to coolest and chooses the highest ranked die for temperature based decisions going forward until the next re-identification event. The ranked list may also be persisted along with meta data that describes which event triggered the re-identification process that caused the list to be generated.

The re-identification process may temporarily impact SSD performance because of the high volume of internal temperature measurement traffic. However, the performance penalty is short lived because the SSD controller can collect all the temperature measurement data it needs from all the non volatile memory die in a relatively short amount of time. This may be performed at a transient condition or a steady state condition to gain both static and transient conditions. Because the steady state conditions take longer time to reach final temperature, the static may be achieved at the end of a natural transient temperature from real workload, by then switching to a uniform synthetic workload to energize the drive in multiple workload intensities.

The SSD is apt to perform additional re-identification sequences from time-to-time owing to environmental change or timer expiration. However, consistent with the above paragraph, such occasional re-identification sequences do not severely impact SSD performance because the re-identification sequences are relatively short lived. The SSD's operation is largely marked, particularly in environments where change based triggers are not presenting themselves at high frequency, with long extended periods of time monitoring the temperature of only the single hottest die (which generates minimal internal traffic and provides for maximum SSD performance) interrupted only infrequently by the re-identification process.

Additionally, over time, the SSD controller continually "learns" the SSD's thermo-dynamic characteristics and uses this knowledge to reduce/minimize the performance penalty of the re-identification process. Here, each event that triggers a re-identification sequence can be viewed as a change in the state of the SSD's environment. After an extended runtime of the SSD, a number of same trigger events (same state changes) are apt to be observed (e.g., the same change from a specific first performance state to a specific second performance state). Here, if each of the same trigger events resulted in the same re-identification process outcome, the SSD may choose to not perform the re-identification process in response to a next occurrence of the particular trigger event because it has enough confidence that the result will be the same as the re-identification efforts from the prior occurrences of the particular trigger event.

As such, the SSD simply invokes the prior response without taking temperature measurements of all the die in the SSD. As such, there will be little/no drop in SSD performance because the taking of temperature measurements from all the die in the SSD has been avoided (no large scale internal traffic is generated). Generally, there are two types of results that can consistently/repeatedly result from a same SSD environmental state change and following re-identification sequence: 1) the same die is identified as the hottest die after the state change; or, 2) there is no change in identity of the hottest die (the hottest die remains the same across the state change). In the case of the former, upon a next occurrence of the event, the SSD simply recognizes the particular die as the hottest die (here, the persisted ranked list for the particular state change can be called up from persistence so that the hottest die can be identified). In the case of the later, upon a next occurrence of the event, the SSD does not change the present identity of the hottest die in response to the event.

Although the above described embodiments have focused on identifying only a single die as the hottest die in the SSD and basing thermal control of the SSD from the single die, in other embodiments, more than one die may be recognized as the hottest die. Here, the term "die" can be used to refer to a single semiconductor chip, or, can be used to refer to more than one semiconductor chip (that is, "die" means one or more semiconductor chips).

Thus, according to an alternate approach, the SSD identifies, e.g., the two, three or four (or more) die that were observed to be the hottest die in the SSD after execution of the re-identification process (the multiple hottest die need not have identical temperatures, that is, generally, each of the die in the set of hottest die should be hotter than die that are not included in the set of hottest die, but amongst the die in the set of hottest, some die may be hotter than others). The SSD then monitors temperature readings from each die in the set and bases thermal control decisions from the set of die (e.g., if any of the die in the set approaches a maximum allowed temperature, the SSD controller throttles down the SSD's request acceptance rate). Here, temperature monitoring of more than one die results in more internal SSD traffic and a larger negative impact on SSD performance than temperature monitoring of only a single die. However, there is greater confidence that no die will exceed a maximum temperature rating within the SSD.

Although this particular approach is similar to the subset of die approach described in the background, it nevertheless has some distinct improvements over that approach. Specifically, fewer die may be recognized in the subset (e.g., as described at length above, only a single die may be relied upon, or, e.g., only two hottest die may be recognized).

Additionally, which die are identified for inclusion in the set may change (e.g., from re-identification sequence to re-identification sequence), whereas, in the prior approach described in the background, the identities of the die that were included in the set was permanent/fixed.

As an extension to this approach, in forming the set of multiple hottest die, in an embodiment, one die is chosen from each of multiple die partitions within the SSD. For example, if the SSD is mechanically designed as four stacks of 25 non volatile memory die per stack, the SSD identifies a hottest die from each of the four stacks (so that a total of four die have their temperatures monitored). In SSDs having more stacks but fewer die per stack, a unique hottest die may be identified for inclusion in the set from each of multiple different die stacks. That is, a particular hottest die in the set represents more than one die stack and each die in the set represents a different and unique group of die stacks. Thus, hottest die can be chosen for inclusion in the set from specific structural/mechanical design features of the non volatile memory die layout within the SSD.

Here, certain known characteristics of the thermo-dynamics of the SSD can be used to reduce the re-identification process overhead. For example, if the non volatile memory die in the SSD are assembled in the SSD as a number of die stacks where each die stack contains a specific number of die, and, if it is known that die on the bottom of a stack will run hotter than die at the top of a stack (e.g., because die at the top of a stack are closer to a heat sink), then, the re-identification effort may choose to only measure die in the bottom regions of the stacks (e.g., only the bottom half or bottom third of die in each stack are measured). Thus, relying upon only a subset of the die during the re-identification effort based on known thermal properties of the SSD's mechanical/thermal design can reduce the overall number of die that are measured during the re-identification sequence, which, correspondingly reduces the performance penalty of the re-identification sequence and improves SSD performance.

Figure 2:
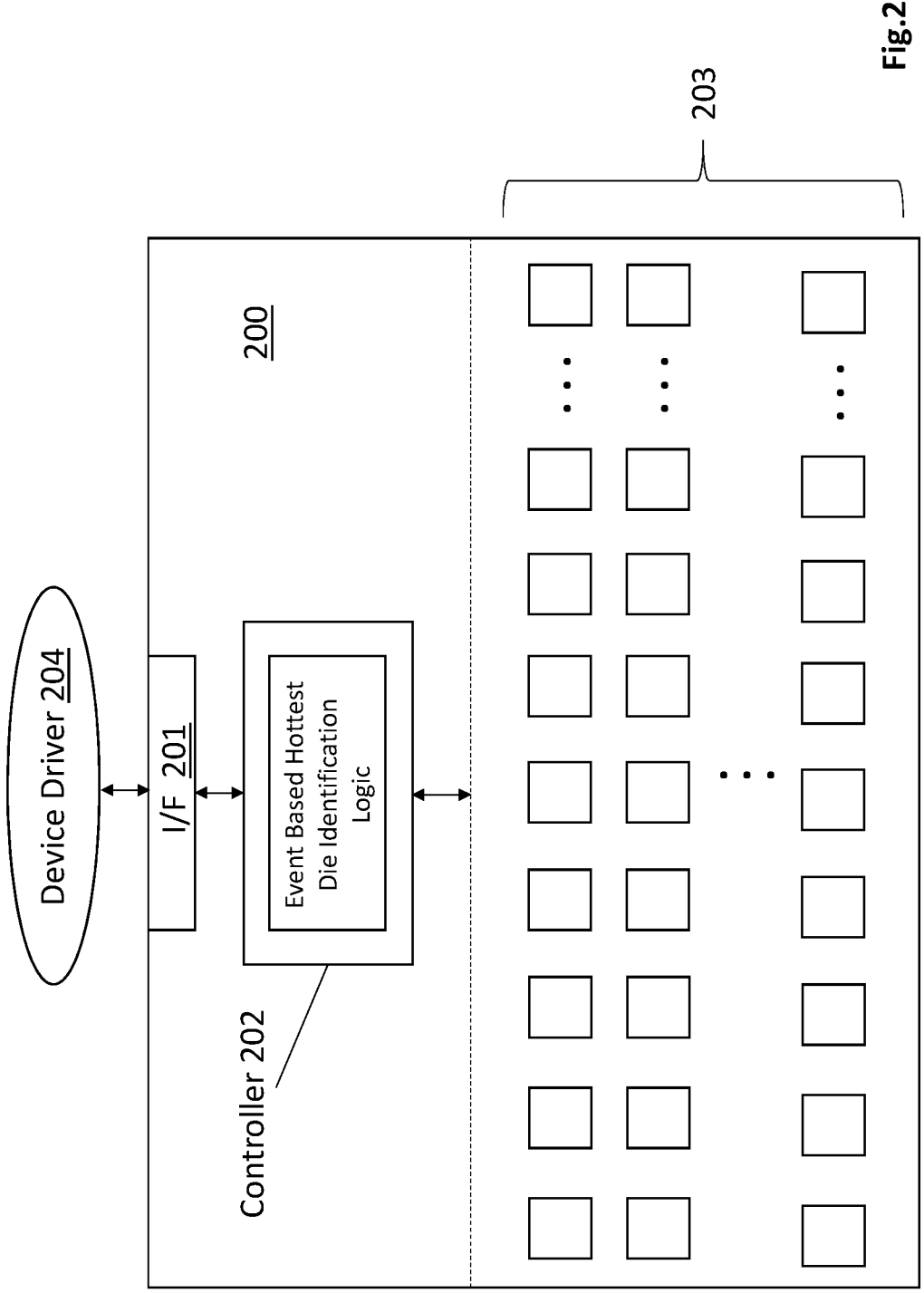
FIG. 2 shows an improved SSD that can execute the temperature control method of FIG. 1.

FIG. 2 shows an SSD 200 having a host interface 201 (e.g., an NVMe (NVM express) interface, a PCIe interface (Peripheral Component Interconnect Express) interface, a SATA (Serial AT Attachment) interface, etc.), a controller 202, and multiple non volatile memory chips 203. The multiple non volatile memory chips 203 may be flash memory chips and/or emerging non volatile memory chips (generally referred to as non volatile random access memory (NVRAM)).

NVRAM memories operate significantly faster than traditional non volatile mass storage devices and/or support finer access granularities than traditional non volatile mass storage devices (which can only be accessed in "pages", "sectors" or "blocks" of data for at least some operations such as erases or writes). With the emergence of NVRAM, traditional non volatile access/usage paradigms may be obviated/lessened in favor of new kinds of non volatile usage/access paradigms that treat non volatile resources more as a true random access memory than a traditional mass storage device.

Some possible examples include: 1) execution of byte addressable non volatile memory read and/or write instructions and/or commands; 2) physically accessing non volatile memory data at CPU cache line granularity; 3) operating software directly out of non volatile memory which behaves as true system memory or main memory (e.g., software main memory access read/write instructions executed by a CPU are completed directly at NVRAM rather than only at non volatile DRAM); 4) assignment of system/main memory address space to non volatile memory resources; 5) elimination and/or reduction of movement of "pages" of data between main memory and traditional mass storage device (s); 6) "commitment" of data as a mechanism of preserving the data (such as traditional database algorithms (e.g., two-phase commit protocol)) to NVRAM system memory rather than a traditional non volatile mass storage device; 7) accessing non volatile memory from a main memory controller rather than through a peripheral control hub; 8) existence of a multi-level system/main memory where the different levels have different access timing characteristics (e.g., a faster, "near memory" level composed of DRAM and slower "far memory" level composed of NVRAM); 9) existence of a "memory-side" cache at the front end of system/main memory (e.g., composed of DRAM) that caches the system/main memory's most requested items including items requested by components other than a CPU such as a display, peripheral, network interface, etc.

Possible technologies for NVRAM include phase change based memory, memory devices having storage cells composed of chalcogenide, a ferro-electric based memory (e.g., FRAM), a magnetic based memory (e.g., MRAM), a spin transfer torque based memory (e.g., STT-RAM), a resistor based memory (e.g., ReRAM), a Memristor based memory, universal memory, Ge2Sb2Te5 memory, programmable metallization cell memory, amorphous cell memory, Ovshinsky memory, "3D Xpoint" or "Optane" memory from Intel, Corp., etc. NVRAM technology may also manufacture a storage cell array as a three dimensional storage cell array, e.g., in the metallurgy above the semiconductor chip substrate, rather than as two dimensional array where the storage cells are embedded in the surface of the semiconductor chip substrate. Storage cells in the three dimensional storage cell array may also be accessed according to a cross-point physical access mechanism (e.g., a targeted cell resides between a pair of orthogonally oriented access wires in the chip's metallurgy).

The controller 202, the SSD's device driver 204 or some combination of both are responsible for implementing the thermal control of the SSD in accordance with the teachings above. Here, if the SSD's controller/driver 202/204 detects that at least one die in the SSD is approaching or is likely to be approaching its maximum allowed temperature, the SSD's controller/driver 202/204 will cause the SSD to accept fewer requests from the host over time and/or request that the host send fewer requests to the SSD over time. Contra-wise, if the SSD's controller/driver 202/204 detects that the hottest die in the SSD is/are well below the maximum allowed temperature, the SSD's controller/driver 202/204 will accept more requests from the host over time and/or inform the host that it can send more requests over time.

The SSD's controller/driver 202/204 can also receive notification of events in the SSD's external environment from the host that cause the controller/driver 202/204 to initiate a re-identification sequence. Here, many such events are recognized by the host operating system, or other host software and reported, e.g., through an API to the SSD's device driver 204 which executes, e.g., on a processor of the host.

The controller 202 may be implemented with various forms of logic circuitry such as hardwired, dedicated logic circuitry (e.g., application specific integrated circuit (ASIC) state machine logic circuitry), programmable logic circuitry (e.g., field programmable gate array (FPGA) logic circuitry, programmable logic array (PLA) logic circuitry, programmable logic device (PLD) logic circuitry), logic circuitry designed to execute program code (e.g., an embedded processor, embedded controller or micro-controller, etc.) or any combination thereof. In the case of logic circuitry designed to execute program code, some or all functions of the thermal management scheme may be implemented as some form of program code (e.g., SSD firmware) stored on a machine readable storage medium (e.g., non volatile memory of the SSD or the host).

Figure 3:
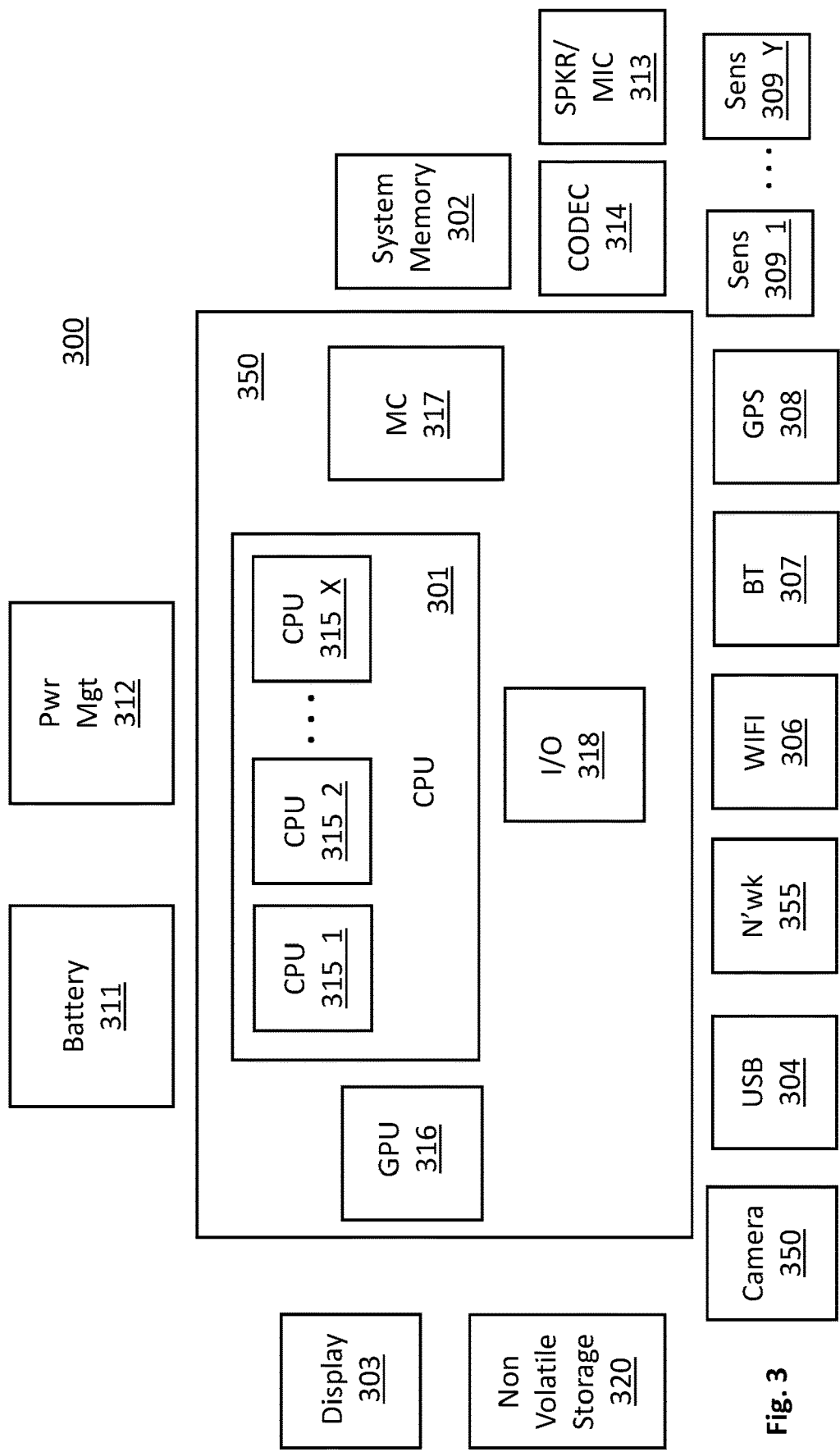
FIG. 3 shows a computing system.

FIG. 3 provides an exemplary depiction of a host computing system 300 (e.g., a smartphone, a tablet computer, a laptop computer, a desktop computer, a server computer, etc.). As observed in FIG. 3, the basic computing system 300 may include a central processing unit 301 (which may include, e.g., a plurality of general purpose processing cores 315_1 through 315_X) and a main memory controller 317 disposed on a multi-core processor or applications processor, system memory 302, a display 303 (e.g., touchscreen, flat-panel), a local wired point-to-point link (e.g., USB) interface 304, various network I/O functions 305 (such as an Ethernet interface and/or cellular modem subsystem), a wireless local area network (e.g., WiFi) interface 306, a wireless point-to-point link (e.g., Bluetooth) interface 307 and a Global Positioning System interface 308, various sensors 309_1 through 309_Y, one or more cameras 310, a battery 311, a power management control unit 312, a speaker and microphone 313 and an audio coder/decoder 314.

An applications processor or multi-core processor 350 may include one or more general purpose processing cores 315 within its CPU 301, one or more graphical processing units 316, a memory management function 317 (e.g., a memory controller) and an I/O control function 318. The general purpose processing cores 315 typically execute the operating system and application software of the computing system. The graphics processing unit 316 typically executes graphics intensive functions to, e.g., generate graphics information that is presented on the display 303. The memory control function 317 interfaces with the system memory 302 to write/read data to/from system memory 302. The power management control unit 312 generally controls the power consumption of the system 300.

Each of the touchscreen display 303, the communication interfaces 304-307, the GPS interface 308, the sensors 309, the camera(s) 310, and the speaker/microphone codec 313, 314 all can be viewed as various forms of I/O (input and/or output) relative to the overall computing system including, where appropriate, an integrated peripheral device as well (e.g., the one or more cameras 310). Depending on implementation, various ones of these I/O components may be integrated on the applications processor/multi-core processor 350 or may be located off the die or outside the package of the applications processor/multi-core processor 350. The computing system also includes non-volatile storage 320 which may be the mass storage component of the system. Such mass storage or even non volatile system memory may be implemented with an SSD that uses improved temperature control techniques as described at length above.

Embodiments of the invention may include various processes as set forth above. The processes may be embodied in machine-executable instructions. The instructions can be used to cause a general-purpose or special-purpose processor to perform certain processes. Alternatively, these processes may be performed by specific/custom hardware components that contain hardwired logic circuitry or programmable logic circuitry (e.g., field programmable gate array (FPGA), programmable logic device (PLD)) for performing the processes, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. An apparatus, comprising:
a solid state drive (SSD) controller comprising logic circuitry to perform an event based hottest non-volatile memory die identification process in which one or more different hottest non-volatile memory die within an SSD that is controlled by the SSD controller are able to be identified over an operational time period of the SSD in response to different respective events that arise during the operational time period and not based on periodic measurements of the SSD's non-volatile memory die during the operational time period, and wherein, at least one event of the event based hottest non-volatile memory die identification process includes a configuration event that occurs externally from the SSD, wherein, detection of the configuration event that occurs externally from the SSD is not based on the SSD controller's monitoring of traffic flows of the SSD's non-volatile memory die.

2. The apparatus of claim 1 wherein the configuration event that occurs externally from the SSD includes any of:
a host configuration event;
a host storage configuration event;
a host I/O configuration event;
a host thermal configuration event;
a host power configuration event.

3. The apparatus of claim 1 wherein at least one other event of the event based hottest non-volatile memory die identification process includes an event that occurs internally within the SSD.

4. The apparatus of claim 3 wherein the other event that occurs internally within the SSD includes any of:
a power state change of the SSD;
a performance state change of the SSD;
a workload change of the SSD;
movement of data items of more frequently accessed PBAs from wear-leveling.

5. The apparatus of claim 1 further comprising a machine readable storage medium in which program code is stored, the program code, when executed, to cause the controller to perform at least a portion of the event based hottest non-volatile memory die identification process.

6. The apparatus of claim 1 wherein the SSD controller is to also perform at least one of the following:

generate artificial traffic to establish a thermal state within the SSD;

learn over time which events result in which non-volatile memory die being a hottest non-volatile memory die.

7. A computing system, comprising:
one or more processing cores;
a system memory;
a memory controller coupled between the one or more processing cores and the system memory;
an SSD, the SSD comprising an SSD controller, the SSD controller comprising logic circuitry to perform an event based hottest non-volatile memory die identification process in which one or more different hottest non-volatile memory die within the SSD are able to be identified over an operational time period of the SSD in response to different respective events that arise during the operational time period and not based on periodic measurements of the SSD's non-volatile memory die during the operational time period, and wherein, at least one event of the event based hottest non-volatile memory die identification process includes a configuration event that occurs externally from the SSD, wherein, detection of the event that occurs externally from the SSD is not based on the SSD controller's monitoring of traffic flows of the SSD's non-volatile memory die.

8. The apparatus of claim 7 wherein the configuration event that occurs externally from the SSD includes any of:
a host configuration event;
a host storage configuration event;
a host I/O configuration event;
a host thermal configuration event;
a host power configuration event.

9. The apparatus of claim 7 wherein at least one other event of the event based hottest non-volatile memory die identification process includes an event that occurs internally within the SSD.

10. The apparatus of claim 9 wherein the other event that occurs internally within the SSD includes any of:
a power state change of the SSD;
a performance state change of the SSD;
a workload change of the SSD;
movement of data items of more frequently accessed PBAs from wear-leveling.

11. The apparatus of claim 7 further comprising a machine readable storage medium in which program code is stored, the program code, when executed, to cause the controller to perform at least a portion of the event based hottest non-volatile memory die identification process.

12. A machine readable storage medium containing program code, and not propagating signal energy, that when processed by a controller of a solid state drive (SSD), causes the controller to perform a method, comprising:
in response to a first event associated with the SSD's environment, identifying one or more hottest non-volatile memory die within the SSD, wherein recognition of the first event is not based on periodic measurements of the SSD's non-volatile memory die, and wherein, the first event is a configuration event that occurs externally from the SSD, and wherein, detection of the first event is not based on the SSD controller's monitoring of traffic flows of the SSD's non-volatile memory die;
throttling SSD workload in response to temperature readings of the one or more hottest non-volatile memory die;
in response to a second event associated with the SSD's environment, identifying one or more different hottest non-volatile memory die within the SSD, wherein recognition of the second event is not based on periodic measurements of the SSD's non-volatile memory die, and wherein, the second event is an event that occurs internally within the SSD; and,
throttling SSD workload in response to temperature readings of the one or more different hottest non-volatile memory die.

13. The machine readable storage medium of claim 12 wherein the first event is any of:
a host configuration event;
a host storage configuration event;
a host I/O configuration event;
a host thermal configuration event.

14. The machine readable storage medium of claim 13 wherein the second event is any of:
a power state change of the SSD;
a performance state change of the SSD;
a workload change of the SSD;
movement of data items of more frequently accessed PBAs from wear-leveling.

* * * * *